Figure 1:
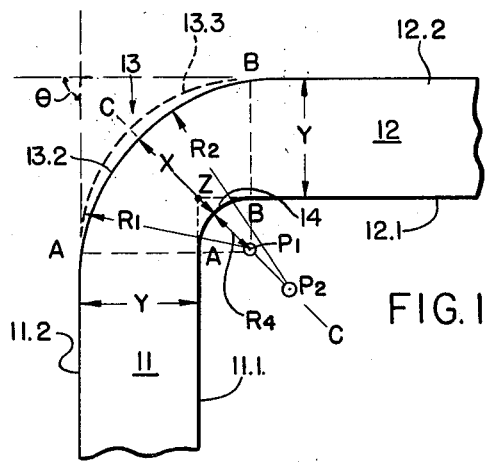

June 15, 1965     R. M. WALKER     3,189,850

RECTANGULAR WAVEGUIDE BEND

Filed Nov. 23, 1962

INVENTOR.
RICHARD M. WALKER
BY Rosen & Schiller
ATTORNEYS

United States Patent Office
3,189,850
Patented June 15, 1965

3,189,850
RECTANGULAR WAVEGUIDE BEND
Richard M. Walker, Newton, Mass., assignor to Microwave Associates, Inc., Burlington, Mass., a corporation of Massachusetts
Filed Nov. 23, 1962, Ser. No. 239,461
The portion of the term of the patent subsequent to January 8, 1980, has been disclaimed and dedicated to the Public
14 Claims. (Cl. 333—98)

This invention relates in general to rectangular waveguide bends, and more particularly to such bends made in a short length of waveguide with improved impedance matching and high voltage capability over the frequency range of a waveguide operating in the fundamental mode.

When a waveguide is bent, a wave being propagated in it is subjected to perturbations which cause impedance mismatch. Many solutions to this problem have heretofore been proposed. For example, bends having very large radius compared to the guide wavelength of the energy to be propagated exist in which perturbations of the propagated waves is minimal and frequency sensitivity of the bend is not involved. These bends, however, require large amounts of space for their gradual curvature, and cannot be used where the required space does not exist, or is needed for other components. Bends of short radius, comparable to the guide wavelength, also exist, in which the bend length is controlled to provide half-wave matching. While these bends relax somewhat the space requirements, they tend to be frequency sensitive, and difficult to impedance match over the full frequency range. There exist also mitre bends, comparable in length to the guide wavelength, in which the mitre section is controlled in length to provide matching; these, too, are subject to frequency sensitivity. Mitre bends have been proposed which have zero inner-wall radius, and these, too, are frequency sensitive; they also have power handling limitations in some cases which restrict the power they can handle to a level below that which the corresponding straight waveguide can handle. In addition, there are post-compensated mitre bends, having interior structures to achieve broader band matching. However, these structures do not achieve the full frequency bandwidth of the straight waveguide, and they introduce critical manufacturing tolerances.

It is the principal object of the present invention to provide a sharp bend having a small inner-wall radius and having superior high-power characteristics. Another object of the invention is to provide such a bend in rectangular waveguide, in the E-plane or the H-plane, which has nearly perfect impedance match over the entire frequency range of a rectangular waveguide operating in the fundamental mode. Another object is to provide such a bend which is easy to construct and readily reproduced.

According to the invention, a bend is provided in which the inner-wall is curved on a first radius which is small, and may be so small that it approximates an abrupt junction, and the outer wall is curved on a second radius which is larger than the sum of the first radius and the transverse (i.e., "$a$" or "$b$") dimension of the basic rectangular waveguide which lies in the plane of the bend, and is centered on a point within the inner-wall bend which point is so located that the portion of the second radius within the bend section lying on the bisector of the angle of the bend is shorter than said waveguide dimension by a prescribed amount such that nearly perfect impedance matching results over the entire frequency range of the basic rectangular waveguide operating in the fundamental mode.

Figure 3:
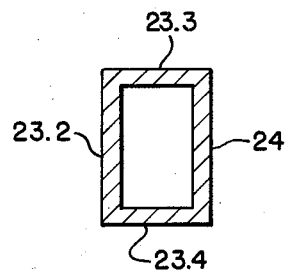
Figure 2:
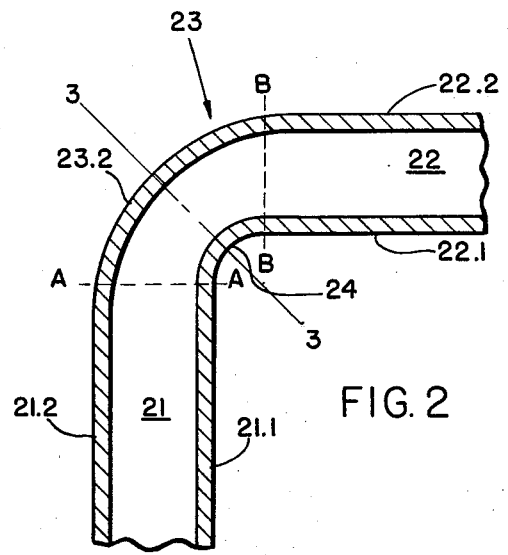

Other and further objects and features of the invention will become apparent from the following description of certain embodiments thereof. This description refers to the accompanying drawings, wherein:

FIG. 1 schematically illustrates the principles of the invention;

FIG. 2 is a longitudinal sectional view of a waveguide bend according to the invention; and FIG. 3 is a cross-section along line 3—3 of FIG. 2.

Referring now to FIG. 1, a rectangular waveguide bend comprises two straight rectangular waveguide sections 11 and 12 which are axially at right angles to each other making a bend angle $\theta$, and an intermediate bent section 13 connected to both. The first straight waveguide section 11 may be considered to be joined to the intermediate section at a plane indicated by the dashed reference line A—A which is transverse to the axis of the first straight section, and the second straight waveguide section 12 may be considered to be joined to the intermediate section 13 at a plane indicated by the dashed reference line B—B which is transverse to the axis of the second straight section 12. The first straight section has two parallel walls 11.1 and 11.2 which are opposite each other, and may in practice be either the two narrow walls or the two wide walls of a rectangular waveguide. Similarly, the second straight waveguide section 12 has two parallel walls 12.1 and 12.2 which may be either the narrow or the wide walls, respectively, of a rectangular waveguide. The inner walls 11.1 and 12.1 are joined by a wall section 14 which is arcuately curved on a first radius $R_4$ centered at a first point $P_1$, which is located substantially at the intersection of the planes A—A, B—B. The outer walls 11.2 and 12.2 are joined by a curved wall section 13.2, the curvature of which will be more particularly described below.

The distance from the first point $P_1$, to either of the outer walls 11.2 or 12.2, at the plane A—A or B—B, respectively, of junction with the intermediate bent section 13, is indicated by the line $R_1$ shown in the curved section 13 of the bend. This is equal to the sum of the first radius $R_4$ and either the "$a$" or the "$b$" dimension of a rectangular waveguide (represented by the transverse line Y in each straight section 11 and 12), depending on whether the bend is an H-plane bend or an E-plane bend. A line C—C bisects the angle $(180°-\theta)$ which would be made by the inner walls 11.1 and 12.1 of the bend if they were extended (as shown by dotted line) to intersect at the point Z shown within the bend. The angle made by the planes A—A and B—B at the first point $P_1$ is the trigonometric supplement of that angle; in the case illustrated in FIG. 1, each of these angles is 90°. The line C—C thus bisects both the angle between the inner walls 11.1 and 12.1 and the trigonometric supplement thereof defined by the two planes A—A and B—B. The outer wall 13.2 of the curved section 13 is arcuately curved on a second radius $R_2$ centered at a second point $P_2$ in the line C—C bisecting these angles of the bend. The curved outer wall 13.2 intersects and mates with the outer walls 11.2 and 12.2 of the straight waveguide sections at the outer edges of the planes A—A and B—B, respectively. A dotted line 13.3 is included in FIG. 1 to illustrate the position of a wall curved on the radius $R_1$ ($R_4+Y$) centered at the first point $P_1$ at which the two planes A—A and B—B intersect. This is to illustrate that the outer wall 13.2 used in the bend according to the invention is curved on a radius which is not centered at the same point as the radius ($R_4$) of the inner wall 14 of the bend. The second radius $R_2$ is larger than the sum $R_4+Y$.

The second point $P_2$ is so located on the bisector line C—C that the distance X from the inner wall 14 of the bend 13 to the outer wall 13.2, along the bisector line C—C, is smaller than the distance Y, that is, smaller than the distance between the two walls 11.1 and 11.2 or 12.1 and 12.2 of either of the straight waveguide sections 11 and 12, respectively. This distance X, for 90° bends, is approximately 95 to 98 percent of the magnitude of the distance Y. In the case of an H-plane ($\theta=90°$) bend, I have found that a magnitude of X which is equal approximately to 0.980 Y yields a good high-power bend having nearly perfect impedance match throughout the rated frequency range of the waveguides 11 and 12 in the fundamental mode. Similarly, for an E-plane ($\theta=90°$) bend, I have found that location of the second point $P_2$ at which X is equal to approximately 0.965 Y yields the same beneficial results. For bends smaller than 90°, X approaches Y, becoming equal to Y at $\theta=0°$, which represents a straight waveguide section. Bends having an angle $\theta$ between 90° and 180° may be constructed (1) from two bends each having $\theta$ equal to ½ of the total desired bend angle, or (2) by a further reduction in the ratio $X/Y$.

Referring to FIGS. 2 and 3, an E-plane bend is shown comprising a first straight rectangular waveguide section 21 having wide walls 21.1 and 21.2, and a second similar straight rectangular waveguide section 22 having wide walls 22.1 and 22.2 each joined to a curved section 23, in the manner illustrated above in connection with FIG. 1. In this bend, the bend angle $\theta=90°$. The two inner wide walls 21.1 and 22.1 are joined by a curved inner wide-wall section 24 of the curved section 23, which has an outer wide-wall 23.2 which is curved in the manner described above in connection with FIG. 1 and which joins the two outer wide-walls 21.2 and 22.2 of the straight waveguide sections. The narrow walls 23.3 and 23.4 of the bent waveguide section 23 are parallel to the respective corresponding narrow walls (not shown) of the straight waveguide sections 21 and 22 and each pair of corresponding narrow walls lies in a common plane.

It will be noted that the bend according to the invention is free of sharp corners or edges in both the inner and outer walls, wide or narrow, of the bent section (13 in FIG. 1, or 23 in FIG. 2). In an E-plane bend, as shown in FIG. 2, this is of particular value because the electric vectors of the fundamental rectangular waveguide mode extend between the wide walls 23.2 and 24, and a sharp corner in the bent section would impose an upper limit on the voltage which can pass through the bend without arcing over. By providing gradual curves in both of these walls, I have extended this upper limit to coincide substantially with the full voltage-handling capability of the straight waveguide sections 21 and 22. At the same time I have provided a bend which achieves substantially the full frequency capability of the corresponding straight waveguide. Further, I have provided all of these capabilities in a structure which is simple to construct of arcuately curved inner and outer walls, which are arcuately curved on respective radii centered at points which are easy to calculate and to locate according to the criteria set forth above.

I have constructed a rectangular ($\theta=90°$) E-plane bend, for use in the $K\mu$ band, of type RG-91/U waveguide having internal dimensions 0.311" x 0.622". In this case $Y=0.311''$, and X was made equal to 0.300", so that the ratio $X/Y=0.965$. The inner wall radius ($R_4$) was 0.250"; the outer wall radius ($R_2$) was 0.590". The rated bandwidth of this type of waveguide is 12-18 kmc./sec. Testing this bend over that bandwidth, I obtained the following VSWR data:

Table I

| Kmc./sec.: | VSWR |
|---|---|
| 12.4 | 1.005 |
| 13.0 | 1.005 |
| 14.0 | 1.005 |
| 15.0 | 1.02 |
| 16.0 | 1.02 |
| 17.0 | 1.005 |
| 18.0 | 1.02 |

I have tested this bend at power levels approximating the breakdown power level for this type of waveguide, and found no greater tendency to break down in the bend than in a straight section of the waveguide. Many variations of the invention are possible. For example, a bend according to the invention can be made consisting solely of an intermediate bend section lying between the planes A—A and B—B in FIG. 1, with or without suitable means for joining such a section to straight rectangular waveguide portions 11 and 12, or 21 and 22 in FIG. 2. It is only necessary that the angle between the planes A—A and B—B be defined in the structure of such a curved section in order that the desired angle between the straight waveguide sections to be attached to it may be achieved. Also, as is mentioned above, the bend is not limited to a 90° angle. Bends of other angular values are possible, and, in such a case, it will be appreciated that the angle between the inner walls 11.1 and 12.1 and the angle between the planes A—A and B—B are the trigonometric supplements of each other and that the line C—C (in FIG. 1) which bisects one will also bisect the other.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. For use in effecting a change in the axial direction of a rectangular waveguide, a bent rectangular waveguide section having a bent intermediate portion, and straight end portions axially disposed relative to each other at the desired angle of said change, each end portion meeting said intermediate bent portion in a plane substantially normal to the axis of said end portion, said planes intersecting each other at a second angle which is the trigonometric supplement of said desired angle, said intermediate portion having an inner arcuate wall curved on a first radius greater than zero and centered at a first point lying on the bisector of said angles, said inner arcuate wall joining first walls of each end portion to constitute the inner wall of said bent waveguide section, the outer wall of said intermediate portion between said planes mating with and joining the second walls of each end portion opposite said respective first walls and being arcuately curved on a second radius longer than the distance between said first and second walls in either of said end portions and centered at a second point lying on said bisector, said second point being so located relative to said first point that the length of the portion of said second radius along said bisector, from said inner wall to said outer wall of said intermediate portion, is a length ranging from about 95% to about 98% of the distance between said first and second walls in either of said end portions, said second point being further from said inner arcuate wall than said first point.

2. For use in effecting a change in the axial direction of a rectangular waveguide, a bent rectangular waveguide section having a bent intermediate portion, and straight end portions axially disposed relative to each other at the desired angle of said change, each end portion meeting said intermediate bent portion in a plane substantially normal to the axis of said end portion, said planes intersecting each other at a second angle which is the trigonometric supplement of said desired angle, said intermediate portion having an inner arcuate wall curved on a first radius greater than zero and centered substantially at the apex of said second angle and joining first walls of each end portion to constitute the inner wall of said bent waveguide section, the outer wall of said intermediate portion between said planes mating with and joining the second walls of each end portion opposite said respective first walls and being arcuately curved on a second radius centered at a point lying within and on the bisector of said desired angle, said point being so located that the length of the portion of said second radius bisecting said second angle from said inner wall to said outer wall of said intermediate portion is approximately five percent less than the distance between said first and second walls in either of said end portions, said point being further from said inner arcuate wall than the center of curvature of said inner arcuate wall.

3. For use in effecting a rectangular change in the axial direction of a rectangular waveguide, a bent rectangular waveguide section having an intermediate bent portion, and straight end portions axially disposed at a first angle of ninety degrees with respect to each other, each end portion meeting said intermediate bent portion in a plane substantially normal to the axis of said end portion, said planes intersecting each other at a second angle of ninety degrees, said intermediate portion having an inner arcuate wall curved on a first radius greater than zero and centered substantially at the apex of said second angle and joining the first walls of each end portion to constitute the inner wall of said bent waveguide section, the outer wall of said intermediate portion between said planes mating with and joining the second walls of each end portion opposite said respective first walls and being arcuately curved on a second radius centered at a point lying within and on the bisector of said first angle, said point being so located that the length of the portion of said second radius bisecting said second angle from said inner wall to said outer wall of said intermediate portion is approximately five percent less than the distance between said first and second walls in either of said end portions, said point being further from said inner arcuate wall than the center of curvature of said inner arcuate wall.

4. For use in effecting a change in the axial direction of a rectangular waveguide in the H-plane, a bent rectangular waveguide section having a bent intermediate portion, and straight end portions axially disposed relative to each other at the desired angle of said change with their respective narrow walls disposed at said desired angle and their respective wide walls lying in common planes, each end portion meeting said intermediate bent portion in a plane substantially normal to the axis of said end portion, said axially normal planes intersecting each other at a second angle which is the trigonometric supplement of said desired angle, said intermediate portion having an inner arcuate wall curved on a first radius greater than zero and centered substantially at the apex of said second angle and joining first narrow walls of each end portion to constitute the inner narrow wall of said bent waveguide section, the outer narrow wall of said intermediate portion between said planes mating with and joining the second narrow walls of each end portion and being arcuately curved on a second radius centered at a point lying within and on the bisector of said desired angle, said point being so located that the length of the portion of said second radius bisecting said second angle from said inner narrow wall to said outer narrow wall of said intermediate portion is at least 95 percent of the distance between said first and second narrow walls in either of said end portions, said point being further from said inner arcuate wall than the center of curvature of said inner arcuate wall.

5. A bent rectangular waveguide section according to claim 4 in which said desired angle is substantially ninety degrees and the length of said portion of said second radius bisecting said second angle from said inner narrow wall to said outer narrow wall of said intermediate portion is approximately 0.980 of said distance between said first and second narrow walls.

6. For use in effecting a change in the axial direction of a rectangular waveguide in the E-plane, a bent rectangular waveguide section having a bent intermediate portion, and straight end portions axially disposed relative to each other at the desired angle of said change with their respective wide walls disposed at said desired angle and their respective narrow walls lying in common planes, each end portion meeting said intermediate bent portion in a plane substantially normal to the axis of said end portion, said planes intersecting each other at a second angle which is the trigonometric supplement of said desired angle, said intermediate portion having an inner arcuate wall curved on a first radius greater than zero and centered substantially at the apex of said second angle and joining first wide walls of each end portion to constitute the inner wide wall of said bent waveguide section, the outer wide wall of said intermediate portion between said planes mating with and joining the second wide walls of each end portion and being arcuately curved on a second radius centered at a point lying within and on the bisector of said desired angle, said point being so located that the length of the portion of said second radius bisecting said second angle from said inner wide wall to said outer wide wall of said intermediate portion is approximately 95 percent of the distance between said first and second wide walls in either of said end portions, said point being further from said inner arcuate wall than the center of curvature of said inner arcuate wall.

7. A bent rectangular waveguide section according to claim 6 in which said desired angle is substantially ninety degrees and the length of said portion of said second radius bisecting said second angle from said inner wide wall to said outer wide wall of said intermediate portion is approximately 0.965 of said distance between said first and second wide walls.

8. For use in effecting a change in the axial direction of a rectangular waveguide transmission line, a bent rectangular waveguide section having first and second rectangular waveguide openings at planes disposed relative to each other at a second angle which is the trigonometric supplement of the desired angle of said change, said bent section having an inner arcuate wall curved on a first radius greater than zero and centered at a first point lying on the bisector of said angles and extending substantially between the respective inner boundaries of said openings, said bent section having an outer arcuate wall extending substantially between the respective outer boundaries of said openings and curved on a second radius longer than the distance between the outer and inner boundaries of either of said openings and centered at a second point lying on said bisector, said second point being so located relative to said first point that the length of the portion of said second radius along said bisector between said arcuate walls is a length ranging from about 95% to about 98% of said distance, said second point being further from said inner arcuate wall than said first point.

9. For use in effecting a change in the axial direction of a rectangular waveguide transmission line, a bent rectangular waveguide section having first and second rectangular waveguide openings at planes disposed relative to each other at a second angle which is the trigonometric supplement of the desired angle of said change, said bent section having an inner arcuate wall curved on a first radius greater than zero and centered substantially at the apex of said second angle and extending substantially between the respective inner boundaries of said openings, said bent section having an outer arcuate wall extending substantially between the respective outer boundaries of said openings and curved on a second radius longer than the distance between the outer and inner boundaries of either of said openings and centered at a point so located in the line bisecting said angles that the length of the portion of said second radius between said arcuate walls along said line is approximately five percent less than said distance, said point being further from said inner arcuate wall than the center of curvature of said inner arcuate wall.

10. A bent rectangular waveguide section according to claim 9 in which said arcuate walls are the narrow rectangular waveguide walls and the bend lies in the H-plane, and said length of said portion of said second radius is approximately 0.980 of said distance between said inner and outer boundaries.

11. A bent rectangular waveguide section according to claim 9 in which said arcuate walls are the wide rectangular waveguide walls and the bend lies in the E-plane, and said length of said portion of said second radius is approximately 0.965 of said distance between said inner and outer boundaries.

12. For use in effecting a rectangular change in the axial direction of a rectangular waveguide transmission line, a bent rectangular waveguide section having first and second rectangular waveguide openings at planes disposed at a right angle to each other, said bent section having an arcuate inner wall extending between the respective inner boundaries of said openings and being arcuately curved on a first radius greater than zero and centered approximately at the apex of said angle, said bent section having an arcuate outer wall extending between the respective outer boundaries of said openings, said outer wall being arcuately curved on a second radius longer than the distance between the outer and inner boundaries of either of said openings and centered at a point so located in the line bisecting the angle between said planes that the length of the portion of said second radius between said arcuate wall within said bent section along said line is approximately five percent less than said distance, said point being further from said inner arcuate wall than the center of curvature of said inner arcuate wall.

13. For use in effecting a rectangular change in the axial direction of a rectangular waveguide transmission line in the H-plane, a bent rectangular waveguide section having first and second rectangular waveguide openings at first and second planes disposed at a right angle to each other, the corresponding longer boundaries of said openings being disposed, respectively, in third and fourth parallel planes substantially normal to said first and second planes and containing, respectively, the wide walls of said section, one shorter boundary of each opening being further from the apex of said angle than the other, said bent section having an arcuate inner wall extending between the respective inner shorter boundaries of said openings and being arcuately curved on a first radius greater than zero and centered approximately at the apex of said bent section having an outer arcuate wall extending between said further shorter boundaries, said outer wall being arcuately curved on a second radius longer than the distance between the shorter boundaries of either of said openings and centered at a point so located in the line bisecting the angle between said first and second planes that the length of the portion of said second radius between said arcuate walls within said bent section along said line is approximately 0.980 of said distance, said point being further from said inner arcuate wall than the center of curvature of said inner arcuate wall.

14. For use in effecting a rectangular change in the axial direction of a rectangular waveguide transmission line in the E-plane, a bent rectangular waveguide section having first and second rectangular waveguide openings at first and second planes disposed at a right angle to each other, the corresponding shorter boundaries of said openings being disposed, respectively, in third and fourth parallel planes substantially normal to said first and second planes and containing, respectively, the narrow walls of said section, one longer boundary of each opening being further removed from the apex of said angle than the other, said bent section having an arcuate inner wall extending between the respective inner longer boundaries of said openings and being arcuately curved on a first radius greater than zero and centered approximately at the apex of said angle, said section having an outer arcuate wall extending between said further longer boundaries, said outer wall being arcuately curved on a second radius longer than the distance between the longer boundaries of either of said openings and centered at a point so located in the line bisecting the angle between said first and second planes that the length of the portion of said second radius between said arcuate walls within said bent section along said line is approximately 0.965 of said distance, said point being further from said inner arcuate wall than the center of curvature of said inner arcuate wall.

References Cited by the Examiner
UNITED STATES PATENTS

| 2,512,849 | 6/50 | Corke et al. | 333—98 |
| 3,072,870 | 1/63 | Walker | 333—98 |

FOREIGN PATENTS

| 732,443 | 6/55 | Great Britain. |

HERMAN KARL SAALBACH, *Primary Examiner.*